July 16, 1957   L. E. OSBORNE   2,799,140
POWER BOOST MASTER CYLINDER
Filed March 29, 1955
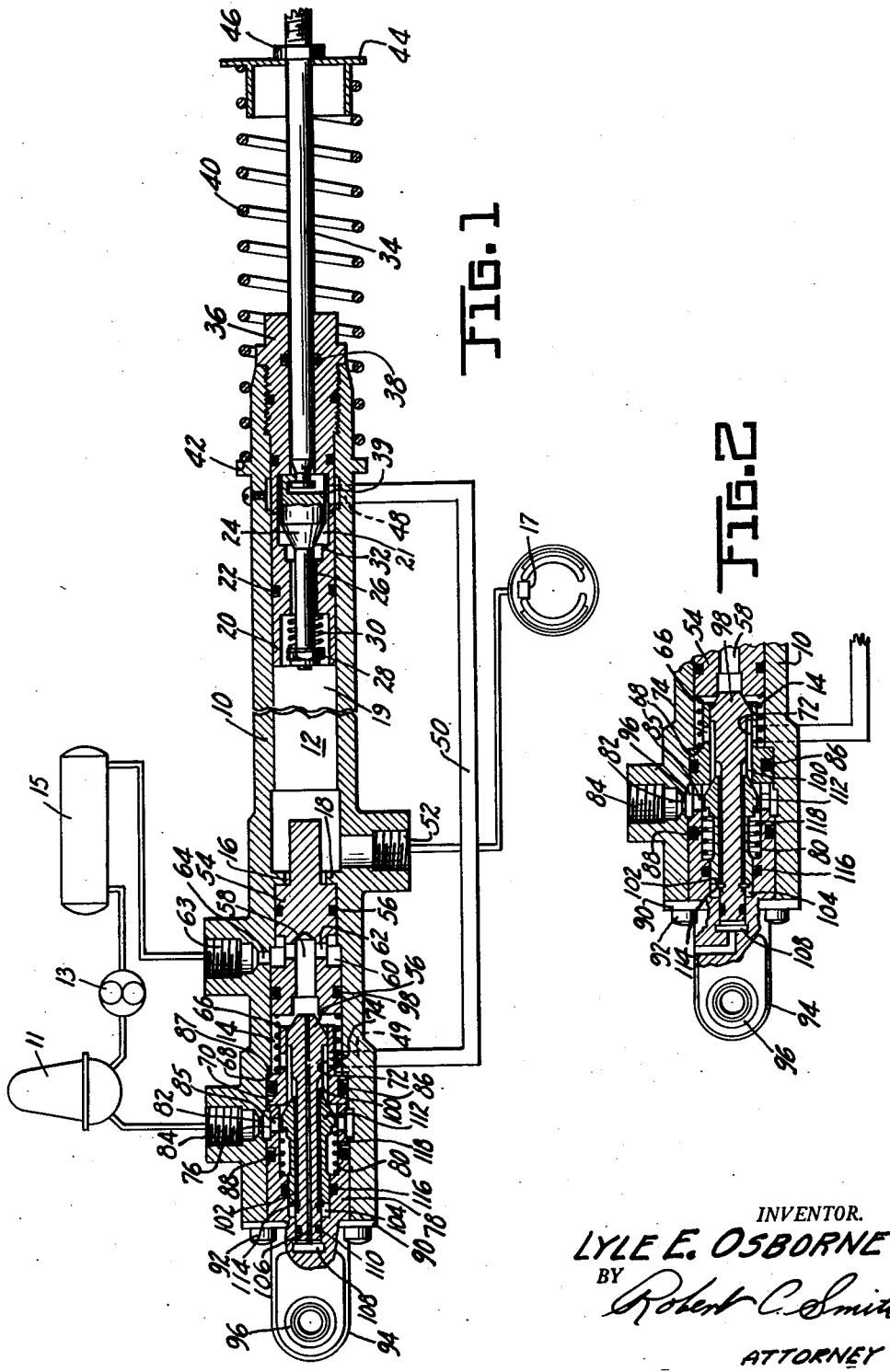
INVENTOR.
LYLE E. OSBORNE
BY Robert C. Smith
ATTORNEY

United States Patent Office 2,799,140
Patented July 16, 1957

2,799,140

POWER BOOST MASTER CYLINDER

Lyle E. Osborne, South Bend, Ind., assignor to Bendix Aviation Corporation, South Bend, Ind., a corporation of Delaware Application March 29, 1955, Serial No. 497,523

4 Claims. (Cl. 60—54.6)

This invention relates to a power boost unit adapted to control the fluid pressure for operating a fluid motor which performs useful work. In particular, the present invention relates to a power assisted master cylinder for use in a hydraulic brake system.

In the past, power boost master cylinders of the type discussed herein have been inadequate in that the forces required for a given brake pressure were subject to variation during the application and release of the brake. Because of valve operation in previous devices, the force required for a given brake pressure is less during brake release than during brake application. To an extent, smooth operation and responsiveness must be sacrificed by these systems because of the inherent limitations imposed by such an unbalance of forces during the operation of the brake. This undesirable operating characteristic has been eliminated in the present invention by the provision of an inlet-outlet valve arrangement which has a balance of forces acting upon it at any given brake pressure. This balancing action assures an operation such that, for a given brake pressure, the operator applied force would be substantially the same during both dynamic application and release of the brake.

It is an object of this invention to provide a power boost master cylinder which is capable of operating with a high degree of sensitivity and which will perform consistently with respect to brake pressure vs. operator applied force especially during a dynamic application and release of the brake.

It is another object of this invention to provide a power boost master cylinder which is more responsive to a manually applied force than units presently in use thereby resulting in a braking effort which is easier to control.

It is a further object of this invention to provide a power boost master cylinder with a balanced inlet-outlet valve which requires, for a given brake pressure, substantially the same operator applied force regardless of whether the brake is being applied or released.

A still further object of this invention is to provide a fluid pressure regulating unit which will accurately control fluid pressure in a manner proportional to an operator applied force.

Other objects and advantages will become appaent in the following description and drawings:

Figure 1 is a cross-sectional view of a power boost master cylinder embodying my invention shown in conjunction with a fluid pressure system; and Figure 2 is a partial cross-sectional view showing a modified form of my invention.

Referring to Figure 1 of the drawings it will be seen that the power boost master cylinder 10 is connected in a fluid pressure system which includes an accumulator 11, pump 13, reservoir 15 and motor 17 arranged to operate a brake as is commonly known in the art. The cylinder 10 having a plurality of ports is divided into two chambers 12 and 14, communicating through passage 16 concentric with annular shoulder 18. The right hand chamber 12 encloses piston 20 which is slidable therein and which separates variable volume chambers 19 and 21. An O ring 22 attached to the piston provides a fluid seal between the adjacent surfaces of the chamber and piston. Valve 24 extending through bore 26 in piston 20 is removably secured to the piston by a nut 28 threadedly engaged with the shank of valve 24. A compressed spring 30 interposed between the nut and the piston urges valve 24 toward its seat 32 on piston 20. An operator operated rod 34 removably secured to valve 24 protrudes through an end cap 36 threadedly engaged with casing 10. An O ring 38 disposed in end cap 36 having radial passages 39 therethrough provides an effective seal between the rod and end cap. A spring 40 seated against shoulder 42 of casing 10 acts against a retainer plate 44 attached to rod 34. The spring serves to force rod 34 to its outermost position in the absence of an externally applied force. Retainer plate 44 is held in position by an adjustable backing nut 46 threadedly engaged with rod 34. As shown, spring 40 provides sufficient force in opposition to spring 30 to hold valve 24 off the seat 32 when piston 20 abuts end cap 36 allowing subsequent abutment of valve 24. Fluid communication will exist between opposite surfaces of piston 20 while valve 24 is unseated. Port 48 provides communication between chamber 21 and chamber 14 via passages 39, conduit 50 and port 49. Port 52 permits the transfer of pressurized fluid from chamber 19 to a fluid motor operably connected to a brake, not shown.

The left hand chamber 14 has a plurality of diameters, two of which contain stepped piston 54 slidable therein. The O rings 56 attached to piston 54 provide a seal between adjacent surfaces of the chamber and piston. Piston 54 having a reduced diameter portion extending through passage 16 abuts against shoulder 18. The reduced diameter of piston 54 is substantially less than the diameter of passage 16. Bore 58 extends axially through piston 54 with one end terminating within the piston and communicating with an annular chamber 60 through radial passages 62. Annular chamber 60 formed on the periphery of piston 54 further communicates with a reservoir return port 63 via passage 64 through casing 10. Piston 54 is held in abutment with shoulder 18 by a spring 66 which in turn seats against shoulder 68 on a bushing 70 having a central bore 72 and radial passages 74 formed therein. An annular groove 76 formed on bushing 78 having a stepped blind bore 80 terminating within the smaller diameter is adjacent to passage 82 which communicates with inlet port 84. The bore 80 communicates with groove 76 through radial passages 85. Bushing 78 bears against member 70 positioning it securely against shoulder 87. Members 70 and 78 having sealing rings 86 and 88, respectively, attached thereto are removably secured within casing 10 by end plate 90 fastened to casing 10 by members 92 threadedly engaged with the casing. An extension 94 of member 78 extends beyond end plate 90 thereby providing a means for mounting the unit to an appropriate stationary structure, not shown. Extension 94 has a floating bearing 96 enabling the unit to pivot about the bearing when mounted. Outlet valve 98 slidable within member 70 and seated against piston 54 has a shoulder 100 adjacent to which are milled slots 102. The slots 102 are 180° apart and extend along the outer surface of the valve thereby connecting bore 72 and annular chamber 104. A small bore 106 extends through valve 98 thus providing a passage between the bore of piston 54 and variable volume chamber 108 within which valve 98 slides. Valve 98 has an O ring 110 secured thereon providing fluid sealing means. Valve 112, concentric with valve 98, contacts shoulder 100 being removably secured thereto by locking ring 114 attached to valve 98. The O ring 116 attached to bushing 78 provides a fluid seal between adjacent surfaces of member 78 and valve 112. Spring 118, one end seating against member 78 and the other end acting against valve 112, urges valve 112 toward its seat on bushing 70 subsequently causing valve 98 to move toward its seat on piston 54.

When the operator wishes to cause operation of the controlled fluid motor, he applies a force at the end of rod 34 thereby displacing the rod inwardly of chamber 12 causing valve 24 secured thereto to move away from end cap 36 thus causing a subsequent seating of the valve against piston 20 and a sealing of the passage through piston 20. Further movement of rod 34 causes a displacement of piston 20 thereby pressurizing the fluid within chamber 19. The pressurized fluid in turn acts against inlet-outlet valve actuating piston 54 in addition to pressurizing the fluid motor operably connected to the brake, not shown. Sufficient force acting against piston 54 will displace the piston against the resistance of spring 66, subsequently causing piston 54 to seat against outlet valve 98. Additional force applied to rod 34, which in turn acts against piston 20, produces additive pressurization of fluid within chamber 19 thus causing a concomitant movement of inlet valve 112 and outlet valve 98 against spring 118 thereby unseating inlet valve 112 from bushing 70 and permitting fluid from the high pressure source to flow through bore 72 into annular chamber 74. The fluid subsequently progresses through port 49, conduit 50, port 48 and passages 39, thereafter communicating with piston 20. The fluid under pressure thus transmitted will cause further pressurization of the fluid communicating with piston 54 and the fluid motor thereby greatly augmenting the force available for braking.

The summation of the forces acting upon the combined inlet-outlet valve 112, 98 during pressurization is such that the valve is balanced at any given brake pressure. The balancing effect is produced as follows: At any given brake pressure an associated amount of fluid under pressure will be permitted to pass through inlet valve 112 thereafter acting against various areas of the aforementioned elements disposed in chambers 12 and 14. Piston 54 seating against outlet valve 98 is acted upon by opposing unequal pressures. The forces produced by these pressures are equalized by a differential in area exposed to the pressures thereby causing the piston 54 to assume a balanced position. The inlet and outlet valves have surfaces upon which fluid pressure is exerted such that any force tending to move outlet valve 98 away from piston 54 will be opposed by an equal force tending to move the outlet valve toward piston 54. This is accomplished by subjecting equal fluid pressures against oppositely disposed equal areas of the valve. Milled slots 102 permit fluid under pressure to communicate with chamber 104 thereby producing a force against inlet valve 112 which balances the opposite force produced by fluid pressures acting against the effective seating area of valve 112. Outlet valve 98 acted upon at both ends by reservoir pressure existing within bore 58 will also be balanced as a result of having equal areas exposed to the fluid pressure.

If the operator applied force is increased due to a demand for higher brake pressure, the piston 54 and inlet valve 112 will be temporarily unbalanced and inlet valve 112 will be caused to move to allow more fluid from the high pressure source to enter chamber 14, thus rebalancing piston 54 and the inlet-outlet valve.

If the operator wishes to partially diminish the brake pressure, he releases a portion of the operator applied force thereby causing an unbalancing of the forces acting against piston 54. This permits the piston to unseat and move away from outlet valve 98 thereby allowing fluid to escape through bore 58 back to the reservoir. Upon escape of sufficient fluid pressure, piston 54 will again be caused to seat against outlet valve 98 and a rebalancing of forces will occur permitting the maintenance of the desired brake pressure.

Upon removal of the operator applied force, piston 20, influenced by the fluid pressure existing in the brake actuating fluid motor, will force rod 34 toward its outermost position thus developing an increasing volume to the left of piston 20 with a consequent decrease in brake pressure therein. The spring 40 will cause piston 20 to abut end cap 36 allowing subsequent unseating of valve 24 and abutment of the valve against end cap 36. Piston 54 will be unbalanced by the decrease in brake pressure within chamber 19 and will abut shoulder 18. The combined inlet-outlet valve 112, 98 acted on by spring 118 moves to seat inlet valve 112 consequently sealing off fluid flow from the high pressure source. Outlet valve 98 which is restrained from seating against piston 54 because of its fixed relationship with inlet valve 112 will permit fluid pressure to escape through bore 58 to the reservoir return line. Pressurized fluid within chamber 19 will escape through piston 20 to chamber 21, thereafter being transmitted to chamber 14 via port 48, conduit 50, and port 49. The pressure within chambers 12 and 14 will then be at a minimum with the brake completely released.

A modification of the outlet valve 98 is shown in Figure 2 wherein said valve contains no passage such as the bore 106 previously mentioned. The chamber 108 is exposed to atmospheric pressure instead of reservoir pressure. The balancing procedure occurs in the same manner as described above except for the action of spring 118. Assuming that the reservoir pressure is constant, spring 118 is chosen having a force sufficient to maintain valve 98 seated against piston 54.

Although only two modifications of the invention are disclosed herein, numerous changes may be made to suit requirements.

I claim:

1. A device for controlling the operation of a fluid pressure motor comprising a cylindrical casing having a uniform diameter bore in one end thereof and an outlet for said bore, a piston reciprocable in said bore having a passage therethrough and serving as a partition for first and second chambers, an operator operated rod reciprocably carried by said casing for moving said piston on its pressure stroke, a spring urging said rod to a retracted position, a valve attached to said rod and arranged to close the passage through the piston and thereafter transmit force from the rod to the piston to displace liquid from said first bore, a stepped diameter bore coaxially arranged at the end of said first chamber opposite the second chamber with the smaller diameter end opening into said first chamber, a stepped diameter piston reciprocably arranged in said stepped bore with the small diameter end being exposed to said first chamber, a spring urging said stepped diameter piston towards said first chamber, a conduit connecting a third chamber adjacent the large diameter end of the stepped piston to said second chamber, a reservoir port communicating with said stepped bore intermediate the ends of the stepped piston, a passage in said stepped piston communicating the reservoir port with said third chamber, a pressure inlet port having communication with said third chamber, first and second bushings located in said third chamber, a first valve seat formed on said stepped piston, a second valve seat formed on said first bushing, a cylindrically shaped outlet valve element slidable within said bushings and seatable on said first valve seat, said outlet valve element controlling communication between said passage in said stepped piston and said third chamber, a tubular inlet valve element affixed to and surrounding said outlet valve element and seatable on said second valve seat, said inlet valve element controlling communication between said inlet port and said third chamber, a first passage communicating the fluid pressure acting on the effective seating area of said outlet valve element with the opposite end thereof, a second passage communicating the fluid pressure acting on the effective seating area of said inlet valve element with the opposite end thereof, said effective seating areas of said outlet and inlet valves being equal to the exposed areas of the opposite end thereof, thereby providing hydraulically balanced valve elements.

2. A device for controlling the operation of a fluid pressure motor comprising a cylindrical casing having a bore in one end thereof and an outlet for said bore, a piston reciprocable in said bore having a passage therethrough and serving as a partition for first and second chambers, an operator operated rod reciprocably carried by said casing for moving said piston on its pressure stroke, a valve attached to said rod and arranged to close the passage through the piston and thereafter transmit force from the rod to the piston to displace liquid from said first bore, a stepped diameter bore adjacent said first chamber, a stepped diameter piston reciprocably arranged in said stepped bore with one end exposed to said first chamber, a conduit connecting a third chamber adjacent the other end of the stepped piston to said second chamber, a reservoir port communicating with said stepped bore intermediate the ends of the stepped piston, a passage in said stepped piston communicating the reservoir port with said third chamber, a pressure inlet port communicating with said third chamber, first and second bushings located in said third chamber, a first valve seat formed on said stepped piston, a second valve seat formed on said first bushing, an outlet valve element having one end reciprocable in a first variable volume chamber formed by said second bushing and the other end seatable on said first valve seat, said outlet valve element controlling communication between said passage in said stepped piston and said third chamber, a tubular inlet valve element affixed to and surrounding said outlet valve element, said inlet valve element having one end reciprocable in a second variable volume chamber formed by said second bushing and the other end seatable on said second valve seat for controlling communication between said inlet port and said third chamber, and passage means communicating the fluid pressure acting against the outlet and inlet valve elements to said first and second variable volume chambers respectively, thereby hydraulically balancing said valve element.

3. A device for controlling the operation of a fluid pressure motor comprising a cylindrical casing having a bore in one end thereof and an outlet for said bore, a piston reciprocable in said bore having a passage therethrough and serving as a partition for first and second chambers, an operator operated rod reciprocably carried by said casing for moving said piston on its pressure stroke, a valve attached to said rod and arranged to close the passage through the piston and thereafter transmit force from the rod to the piston to displace liquid from said first bore, a stepped diameter bore adjacent said first chamber, a stepped diameter piston reciprocably arranged in said stepped bore with one end exposed to said first chamber, a conduit connecting a third chamber adjacent the other end of the stepped piston to said second chamber, a reservoir port communicating with said stepped bore intermediate the ends of the stepped piston, a passage in said stepped piston communicating the reservoir port with said third chamber, a pressure inlet port communicating with said third chamber, first and second valve seats formed within said third chamber, concentric outlet and inlet valve elements fixed relative to each other and seatable on said first and second valve seats for controlling flow between said inlet port, third chamber and said reservoir port, and passage means communicating the fluid pressure acting against the outlet and inlet valve elements to the opposite ends thereof, thereby hydraulically balancing said valve elements.

4. A device for controlling fluid pressure comprising a first fluid pressure responsive member which separates first and second chambers, a second fluid pressure responsive member having opposite end faces of different diameters, the smaller diameter face being in communication with the first chamber, means connecting a third chamber communicating with the larger diameter face of said second fluid pressure responsive member with said second chamber, valve means responsive to movement of said second fluid pressure responsive member to control admission of fluid pressure to said third chamber, said valve means comprising an outlet valve element, an inlet valve element attached to said outlet valve element, inlet and outlet valve seats associated with said elements and located within said third chamber, passage means communicating the fluid pressure acting on the effective seating area of said outlet valve element with the opposite end thereof, second passage means communicating the fluid pressure acting on the effective seating area of said inlet valve element with the opposite end thereof, said effective seating areas of said outlet and inlet valves being equal to the exposed areas of the opposite ends thereof, thereby providing a hydraulically balanced valve means.

References Cited in the file of this patent
UNITED STATES PATENTS

| 2,569,028 | Stryker | Sept. 25, 1951 |
| 2,662,377 | Miller | Dec. 15, 1953 |
| 2,698,205 | Gagen | Dec. 28, 1954 |